United States Patent [19]

Fishack

[11] 3,953,911
[45] May 4, 1976

[54] ADJUSTABLE TIE CORD ASSEMBLY

[75] Inventor: Walter W. Fishack, Dallas, Tex.

[73] Assignees: Benson J. Harmon, Jr.; Gordon L. Wallace; Walter W. Fishack, all of Dallas, Tex.

[22] Filed: Mar. 25, 1974

[21] Appl. No.: 454,450

[52] U.S. Cl. .................................. 24/16 R; 24/130
[51] Int. Cl.² ........................................ F16G 11/14
[58] Field of Search ................. 24/130, 82 F, 73 A, 24/18 R, 16 R, 17 A, 17 B, 17 AP, 30.5 R

[56] References Cited
UNITED STATES PATENTS

| 107,952 | 10/1870 | Osborn | 24/130 |
|---|---|---|---|
| 339,008 | 3/1886 | Nicolay | 24/130 |
| 363,495 | 5/1887 | Wilson | 24/130 |
| 402,786 | 5/1889 | Tyler | 24/130 |
| 465,577 | 12/1891 | Kiefer | 24/130 |
| 468,819 | 2/1892 | McAnarney | 24/130 |
| 1,169,650 | 1/1916 | Kendall | 24/130 |
| 1,426,537 | 8/1922 | Bauer | 24/130 |
| 2,803,253 | 8/1957 | Campbell | 24/130 |
| 3,631,568 | 1/1972 | Wolfe | 24/73 A |
| 3,736,925 | 6/1973 | Erman | 24/129 B |

FOREIGN PATENTS OR APPLICATIONS

| 289,729 | 5/1928 | United Kingdom | 24/81 F |
|---|---|---|---|
| 677,450 | 3/1930 | France | 24/130 |
| 57,207 | 7/1911 | Switzerland | 24/130 |
| 4,056 | 12/1897 | United Kingdom | 24/130 |

Primary Examiner—Bernard A. Gelak
Attorney, Agent, or Firm—Hubbard, Thurman, Turner & Tucker

[57] ABSTRACT

An elastic tie cord is attached to a fastener to form an infinitely adjustable tie cord assembly. A finger aperture is provided on the fastener for applying tension to the cord in cooperation with a remote loop at the other end of the cord. A hook on the fastener adjacent the finger aperture includes a curved, tapered slot narrowing to an opening having a width less than the normal diameter of the cord. The cord is tensioned around an object to be secured and the reduced cord diameter is wedged into the slot opening at any desired point on the cord. Upon release of the finger aperture and the remote loop, the cord diameter beyond the fastener returns to normal, wedging the cord firmly in the slot to maintain tension on the portion of the cord around the secured object. The eyelet and the curved slot opening are aligned with the axis of tension of the cord so that the tensioned cord partially pivots the fastener about the cord axis of tension to project the finger aperture upward from the secured object, thereby facilitating access to the finger aperture. An alternate embodiment of the invention includes a fastener having a T-bar shaped appendage for gripping to apply tension. A wedge-shaped aperture is disposed at the base of the T-bar having a narrow vertex for securing the tensioned cord.

6 Claims, 5 Drawing Figures

ADJUSTABLE TIE CORD ASSEMBLY

BACKGROUND AND SUMMARY OF THE INVENTION

The present invention relates to securing apparatus and more particularly to a general purpose stretch tie cord with fastener for providing a tensioned loop of infinitely variable size around objects to be secured.

Current products used for securing purposes frequently include cords on straps which are pulled tightly against the object to be secured. One type of securing device is an elastic stretch cord having a simple plastic or metal hook at both ends. Normally there is no secure grip piece on the hook for pulling to apply the necessary tension to the cord. Consequently, a grip on the hook may be lost during tensioning of the cord, presenting a safety hazard to anyone nearby.

Moreover, such cords are adjustable over only a very limited range, beginning with their normal length. Other cords or straps are not stretchable or have only discrete points of adjustment, thus greatly limiting their versatility.

The present invention is directed to a stretch cord having an attachment member connected to one end to form an infinitely adjustable tie cord assembly. The attachment member includes a grasping means connected to one end of the tie cord for pulling the cord. Attached to the grasping means is a hook device having a slot narrowing to a opening with a width less than the diameter of the cord. The cord is tensioned and wedged tightly into the slot opening at an appropriate point to form a tight loop around the object to be secured. The grasping means and cord loop are then released causing the cord diameter beyond the attachment member to return to normal. The cord is thereby tightly wedged in the slot opening to maintain tension over the securing portion of the cord.

In a more specific aspect of the invention, an infinitely adjustable tie cord assembly includes an elastic shock cord and a fastener attached thereto. The cord has a first loop at one end which passes through an eyehole in the fastener, and a second loop at the other end of the cord. The fastener includes a finger aperture for pulling in cooperation with the loop at the other end of the cord in order to stretch the cord to the desired length. A hook is integral with the fastener and includes curved V-shaped narrowing jaws for gripping the shock cord under tension. The curved slot opening and the eyehole of the fastener are substantially aligned with the tension axis of the cord when the fastener is attached to the stretched cord. This alignment causes the fastener to pivot slightly about the tension axis thereby projecting the finger aperture upward for easy access.

A further aspect of the invention concerns an adjustable tie cord assembly including an elastic shock cord with a fastener attached at one end through a loop in the cord. A T-shaped crossbar is provided integral with the fastener extending transverse to the cord axis for pulling to stretch the cord. At the base of the cross bar is a wedge-shaped aperture for inserting the cord when stretched. The tension cord is wedged into the narrowest vertex of the aperture thereby holding the cord under tension.

DESCRIPTION OF THE DRAWINGS

A more complete understanding of the invention may be had by referring to the following detailed description taken in conjunction with the drawings wherein:

With reference to FIG. 1, the tie cord assembly of the present invention includes a fastener 10 attached to an elastic stretch cord 12. Fastener 10 is provided with a small lobe 14 having an eyelet 16 therein. Cord 12 is attached to the fastener 10 by a loop 18 passing through eyelet 16. Loop 18 is secured by thread 20, preferably of nylon, which is wrapped or sewn tightly around the cord 12 and its end. If desired, plastic tape may be wrapped around thread 20 to improve the appearance. Loop 18 is formed loosely through eyelet 16 so that fastener 10 may pivot transversely relative to cord 12.

Figures 1, 2:
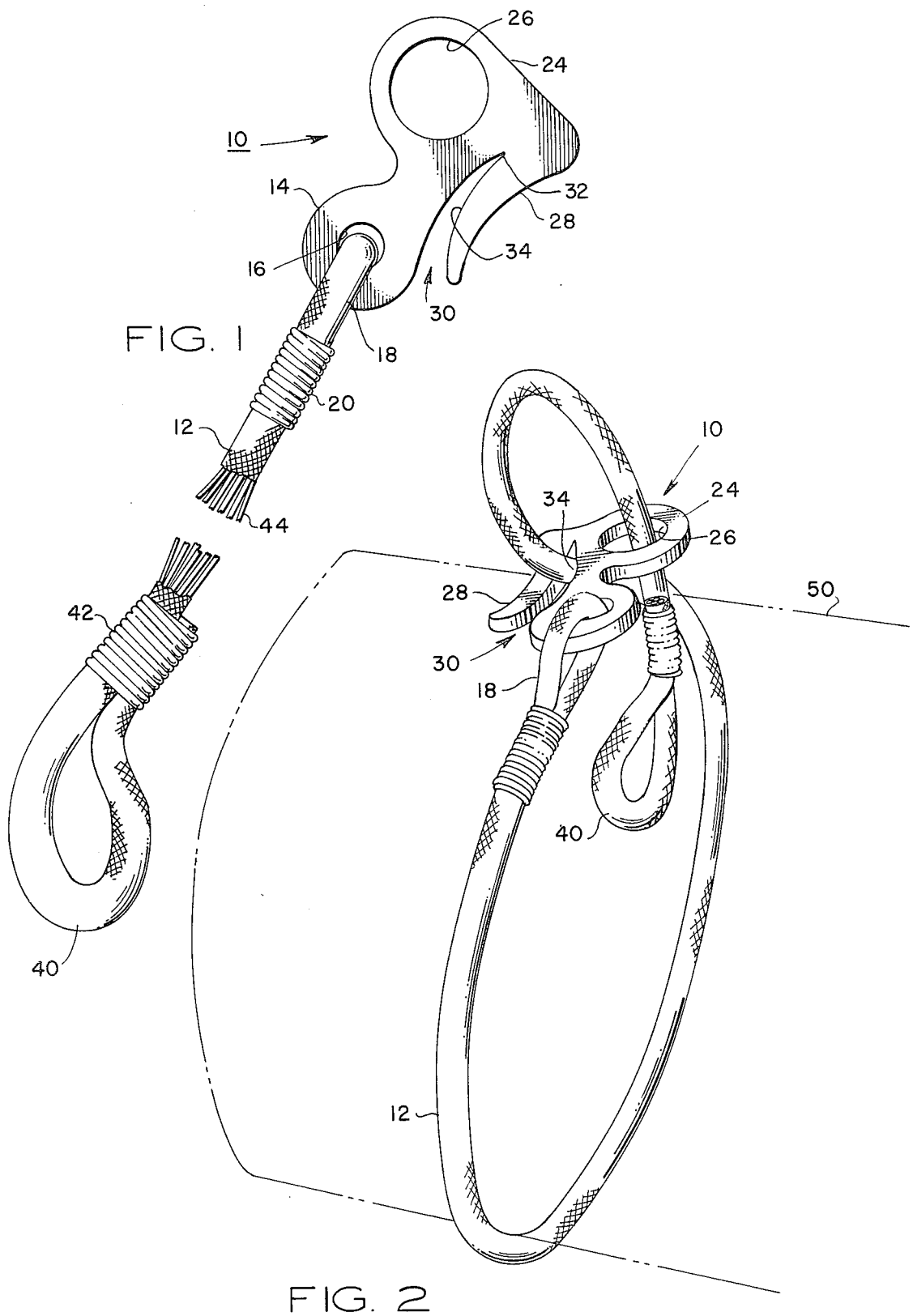
FIG. 1 is a plan partially cut-away view of the tie cord assembly of the present invention.
FIG. 2 is a perspective view of the tie cord assembly of FIG. 1 in tensioning position.

A second larger grip lobe 24 is provided integral with fastener 10 at the end of the fastener opposite small lobe 14. Grip lobe 24 is offset to one side from the cord longitudinal axis and is provided with a finger aperture 26 therein. A hook piece 28 is also integral with the fastener 10 adjacent lobe 24 on the opposite side of the cord longitudinal axis. The hook forms a crescent-shaped slot 30 with the main body of fastener 10 which curves inward toward the center of the fastener. The slot tapers to a vertex 32, forming an opening 34 which has a width less than the normal unstretched diameter of cord 12.

Cord 12 extends any desired length to terminate in a second loop 40 which is secured by thread 42 similar to thread 20. Loop 40 is preferably large enough for fastener 10 to be snugly inserted through loop 40 in order to form a chain of tie cords as later described.

Cord 12, commonly known as a "bungee cord" or a "shock cord," may be formed of any type of stretchable material having the necessary elasticity and long life characteristics. A preferred embodiment incorporates a woven fabric covering a multiple number of rubber cords 44.

Fastener 10 is preferably an integral piece molded out of lightweight plastic, but may be made of wood or other suitable material. In a preferred embodiment, the fastener is approximately 2 9/16 inches long and 2 inches wide, with a thickness of 3/16 inch. Slot 30 narrows from a mouth opening of 5/16 inch to a vertex of 1/16 inch at the opposite end. Finger aperture 26 is approximately one inch in diameter with the center of the opening being approximately on a transverse line with opening 34 in slot 30. Eyelet 16 is about a half inch in diameter.

Thread 20 and 42 which secure loops 18 and 40 respectively are normally made of nylon thread and machine sewn around cord 12 to form loops 18 and 40. Alternately molded plastic or metal crimps may be used, which are preferably sonically welded to the cord. Other types of clamping devices may be used to secure the loops, for example conventional "C-clamps" or "hog rings."

With reference to FIG. 2, tie cord 12 is shown stretched around an object 50 and gripped by fastener 10. Aperture 26 is normally grasped by one or more fingers of one hand while holding end loop 40 with the other hand. Cord 12 is then pulled tightly around the object 50 to be secured and wedged into slot 30 of fastener 10. The diameter of cord 12 is substantially reduced by tension, thereby allowing cord 12 to be jammed further into slot 30 than would be possible if the cord were not stretched. The tensioned cord 12 normally rests within opening 34 having a width less than the normal untensioned diameter of the cord. Grip lobe 24 and end loop 40 are released allowing the boss end of cord 12 between loop 40 and the point gripped by slot 30 to resume its normal diameter thereby enhancing the clamping action of hook 28. The loose end of cord 12 including loop 40 may be inserted through finger aperture 26 for stowage.

In the tensioning position shown in FIG. 2, fastener 10 has been slightly transversely pivoted to align opening 34 containing cord 12 with eyelet 16 and the longitudinal cord axis. Since slot 30 curves inward from one side of fastener 10, the tensioning action of cord 12 causes fastener 10 to pivot slightly about the axis of cord tension. Grip lobe 24 is thereby projected upward away from object 50, allowing easy access to finger aperture 26. Thus, even when cord 12 is stretched extremely tightly about an object, one may easily insert a finger into aperture 26 to release or adjust the tension of cord 12.

The tie cord assembly shown in FIGS. 1 and 2 may be connected to other similar tie cord assemblies to form a multi-length assembly for tasks requiring longer cords. Hook 28 of a first assembly may be inserted through end loop 40 of a second assembly to form a double length cord. Other cords may be attached together to lengthen the effective cord length as desired. Alternately, one may insert end loop 40 of a first cord through end loop 40 of a second cord. Fastener 10 of the second tie cord assembly is then inserted through its own end loop 40 forming a slip knot which passes through end loop 40 of the first cord and is pulled tight to secure the second cord. In this manner, as many other cords as desired may be interconnected.

Figure 3:
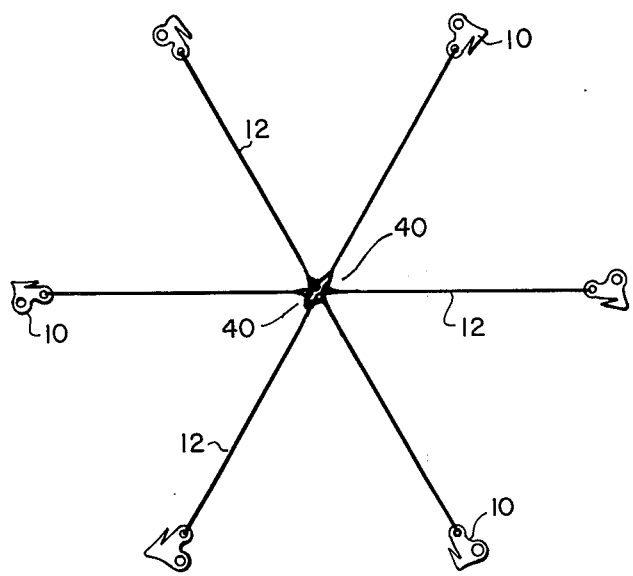
FIG. 3 is a plan view of an alternate embodiment of the tie cord assembly of the present invention.

With reference to FIG. 3, an alternate embodiment is shown utilizing a multiple number of the tie cord assemblies shown in FIGS. 1 and 2. This particular configuration is normally used for securing very large objects, such as on a car luggage rack. The end loop 40 of each cord is connected to the end loops of the other cords so that each cord projects outwardly. Each cord is then stretched about a securing post to the desired tension and wedged tightly into slot 30 of its fastener 10. Alternately, a metal or plastic ring may be attached to the end loop of each cord to form a common connection.

Figure 4:
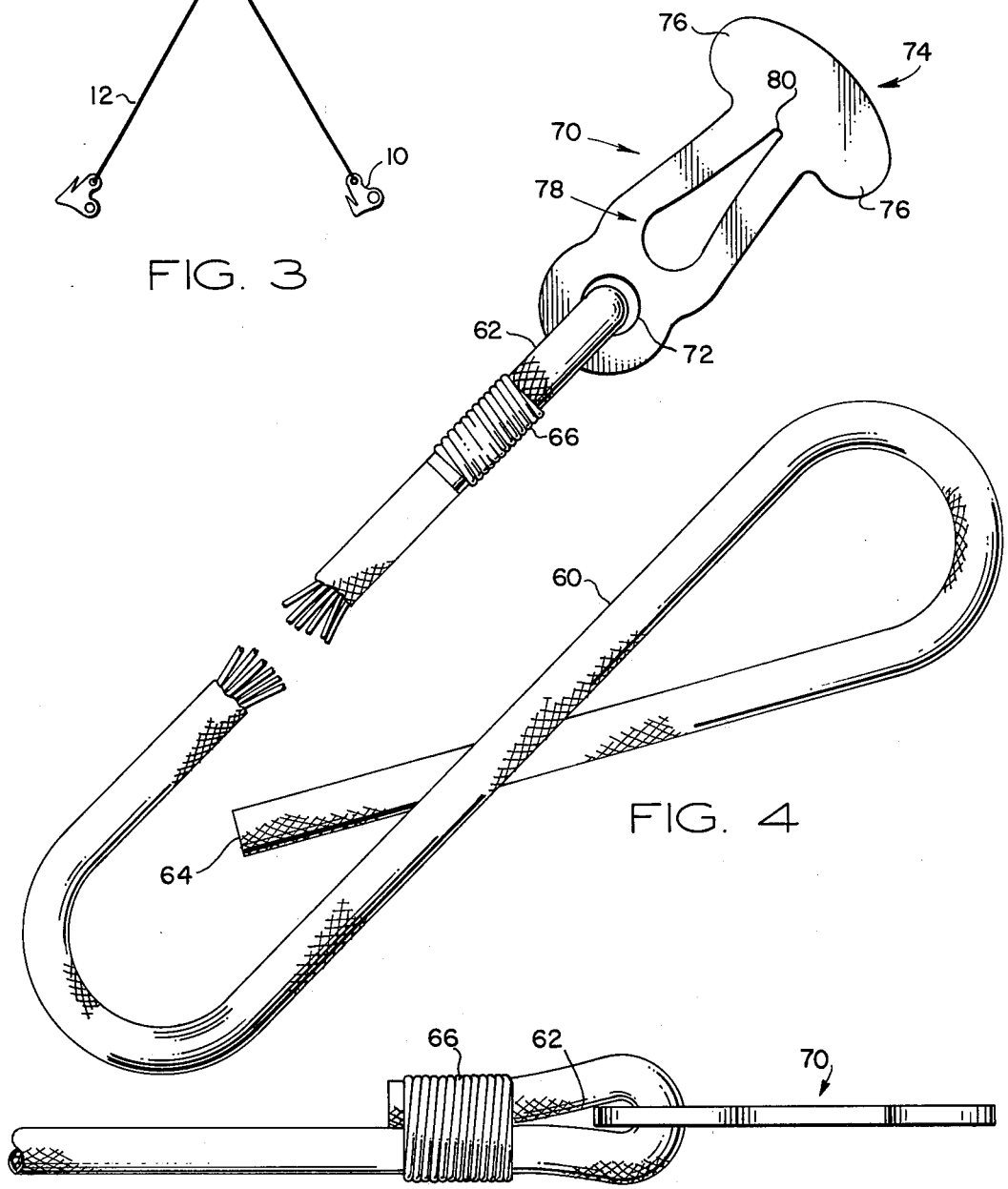
FIG. 4 is a plan view of another alternate embodiment of the tie cord assembly of the present invention.
Figure 5:
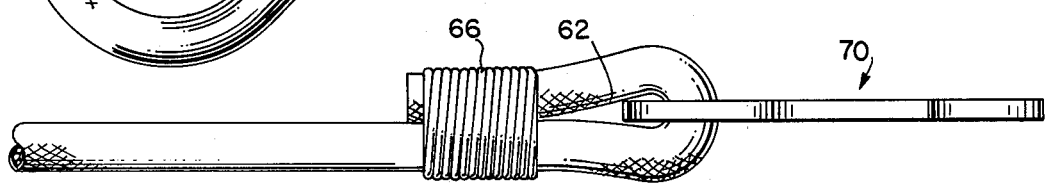
FIG. 5 is a side view of the tie cord assembly of FIG. 4.

Referring now to FIGS. 4 and 5 another alternate embodiment of the present invention is shown. A stretch cord 60 includes a loop 62 at one end secured by crimps 66 in the same manner as shown in FIGS. 1 and 2. The remote end 64 of cord 60 is shown without an end loop, although one may be provided if necessary. A fastener 70 is attached to loop 62 by a loop hole 72 at one end of the fastener. At the opposite end in direct alignment with hole 72 and cord 60 is a crossbar 74 having appendages 76 extending laterally on either side of the crossbar. A wedge-shaped aperture 78 is formed in the body of fastener 70. Aperture 78 tapers away from cord 60 to a vertex 80 adjacent crossbar 74 which is substantially narrower in width than the untensioned cable 60.

In operation, the end 64 of the stretch cord 60 is inserted through wedge-shaped aperture 78 and cord 60 is drawn taut around the article being secured. Once the desired tension is obtained, cord 60 is drawn laterally into vertex 80 of wedge-shaped aperture 78 and then released. The resulting increase in the diameter of the free end of stretch cord 60 insures a tight fit in vertex 80.

As can be seen from the foregoing description, the present invention offers several advantages over other securing devices. The tie cord assembly disclosed may be used where the length needed is either substantially shorter or longer than the length of the cord. The assembly is infinitely adjustable, limited only by the maximum stretch capacity of the cord. The high elasticity of the cord allows exertion of whatever degree of tension may be necessary. The loop at the end of the cord permits the entire cord length to be used. The use of a grip aperture on the fastener and a loop on the opposite end of the cord insure adequate gripping of the assembly during the tensioning process so as to avoid injury or accident. The positioning and configuration of the wedge-shaped slot causes the fastener to partially pivot when gripping the tensioned cord thereby facilitating access to the finger aperture.

The construction of the tie cord assembly lends itself to multiple connections thereby substantially increasing its versatility. The present invention may be used in connection with many outdoor sport activities, such as boating, motorcycling and camping, as well as at home or in business. As an example in sailboating the invention has proved to be very useful in lashing loose sail at various points along a horizontal boom of the boat after the sail has been lowered. Since the sail tapers from a large diameter at the mast to a small diameter at the opposite end of the boom, several sizes of non-adjustable stretch cord ties are required. Using the present invention only one size of tie cord assembly is needed to fit all circumferences. Moreover, the cord is useful for other applications aboard the boat, such as securing halyards from slapping on the mast when the boat is moored. In cycling, the present invention is useful in securing objects to a rear carrying rack. Again, the adjustability of the cord assembly allows various size loads to be carried and secured with the same length cord. Many other applications for the present invention may readily suggest themselves.

Although a particular embodiment of the invention has been illustrated in the accompanying drawings and described in the foregoing description, it will be understood that the invention is not limited to the embodiments disclosed but is capable of rearrangement, modification and substitution without departing from the spirit of the invention.

What is claimed is:

1. An infinitely adjustable tie cord assembly comprising:
   a stretch cord which decreases in cross sectional area when elongated by tension; and
   a fastener connected at one end to one end of the stretch cord, the fastener comprising a body forming a passageway for receiving a human finger, the axis of the passageway being disposed generally normal to the axis of the stretch cord when the stretch cord is tensioned by pulling with a finger inserted in the passageway, said body further forming an open-ended slot having a progressively narrower width for receiving and gripping an intermediate portion of the stretch cord, the entirety of the slot for receiving the stretch cord being disposed to one side of the axis of the stretch cord when tensioned by a finger placed in the passageway and generally parallel to said tensioned stretch cord axis with the open end of the slot nearest the end of the body to which the stretch cord is attached, whereby the stretch cord may be easily fastened around an object by placing a finger of one hand in the passageway, positioning the stretch cord around the object and gripping the other end of the stretch cord with the other hand to stretch the cord and around the object while placing an intermediate portion of the tensioned cord in the slot with a crossing motion of the hands.

2. The tie cord assembly of claim 1 wherein said passageway comprises a finger aperture in said fastener adjacent said open-ended slot.

3. The tie cord assembly of claim 1 and further comprising a hook member depending from said fastener to provide a curved wedge-shaped opening forming said open-ended slot.

4. The tie cord assembly of claim 1 wherein said body forms a first lobe on said fastener having an aperture for connecting said cord to said fastener, and wherein said body forms a second lobe on said fastener having an aperture forming said passageway.

5. The tie cord assembly of claim 1 and further comprising a loop at the end of said stretch cord remote from the end connected to said fastener for applying tension to said cord in cooperation with said fastener and for connecting to a second fastener on a second similar tie cord assembly.

6. The tie cord assembly of claim 1 wherein said slot and said passageway are disposed adjacent each other on said fastener whereby when said cord is held in tension by said slot, said fastener and said cord are twisted about said tensioned stretched cord axis extending said passageway away from said object to facilitate access to said passageway.

* * * * *

UNITED STATES PATENT AND TRADEMARK OFFICE
CERTIFICATE OF CORRECTION

PATENT NO. : 3,953,911
DATED : May 4, 1976
INVENTOR(S) : Walter W. Fishack

It is certified that error appears in the above-identified patent and that said Letters Patent are hereby corrected as shown below:

Col. 3, line 15, "boss" should be -- loose --.

Col. 5, line 18 (Claim 1), "and around" should be -- around --.

Signed and Sealed this

Nineteenth Day of October 1976

[SEAL]

Attest:

RUTH C. MASON
*Attesting Officer*

C. MARSHALL DANN
*Commissioner of Patents and Trademarks*